(12) United States Patent
Ruyten et al.

(10) Patent No.: US 8,210,463 B2
(45) Date of Patent: Jul. 3, 2012

(54) COATINGS FOR TAPE GUIDES

(75) Inventors: Henricus Ruyten, Gumpoldskirchen (AT); Catherine Dinhobl, Vienna (AT)

(73) Assignee: Hewlett-Packard Development Company, L.P., Houston, TX (US)

( * ) Notice: Subject to any disclaimer, the term of this patent is extended or adjusted under 35 U.S.C. 154(b) by 311 days.

(21) Appl. No.: 12/571,331

(22) Filed: Sep. 30, 2009

(65) Prior Publication Data

US 2011/0075293 A1    Mar. 31, 2011

(51) Int. Cl.
    *B65H 75/18*    (2006.01)
(52) U.S. Cl. .................................. 242/610.4; 242/615.2
(58) Field of Classification Search ............... 242/346, 242/346.2, 610.5, 610.4, 615.2, 615.4, 548, 242/566
    See application file for complete search history.

(56) References Cited

U.S. PATENT DOCUMENTS

| | | | | |
|---|---|---|---|---|
| 6,164,577 A | * | 12/2000 | Koike | 242/322 |
| 6,570,740 B1 | * | 5/2003 | Anderson et al. | 360/130.21 |
| 6,873,495 B2 | * | 3/2005 | Dinhobl | 360/130.21 |
| 2003/0075582 A1 | * | 4/2003 | Dinhobl | 226/190 |
| 2003/0218092 A1 | * | 11/2003 | Anderson et al. | 242/615.3 |
| 2008/0237390 A1 | * | 10/2008 | Okizaki | 242/615.2 |

* cited by examiner

*Primary Examiner* — Michael Mansen
*Assistant Examiner* — Juan Campos, Jr.

(57) ABSTRACT

A guide for guiding a magnetic data storage tape has a curved support portion for supporting a major tape surface and at least one flange adjoining the support portion. At least in a region of transition between the support portion and the at least one flange, the guide has an under coating of a diamond like carbon material, tungsten carbide, or similarly wear resistant material, and a surface coating having lower surface tension than the under coating. A tape guide apparatus and a method of making a tape guide are also disclosed.

16 Claims, 4 Drawing Sheets

COATINGS FOR TAPE GUIDES

BACKGROUND

It is known to make a tape guide for guiding a magnetic data storage tape by directly coating a nickel plated aluminium intermediate product with a relatively thick (for example between 1.5 μm and 2.5 μm) coating of zirconium nitride or titanium nitride in an attempt to provide resistance to wear caused by moving contact between one or more surfaces of the guide and a guided tape. However, more sophisticated and faster tape drive mechanisms and/or new tape materials place increasing demands on tape guides.

BRIEF DESCRIPTION OF THE DRAWINGS

In order that the invention may be well understood, by way of example only, various embodiments thereof will now be described with reference to the accompanying drawings, in which.

DETAILED DESCRIPTION

Figure 1:
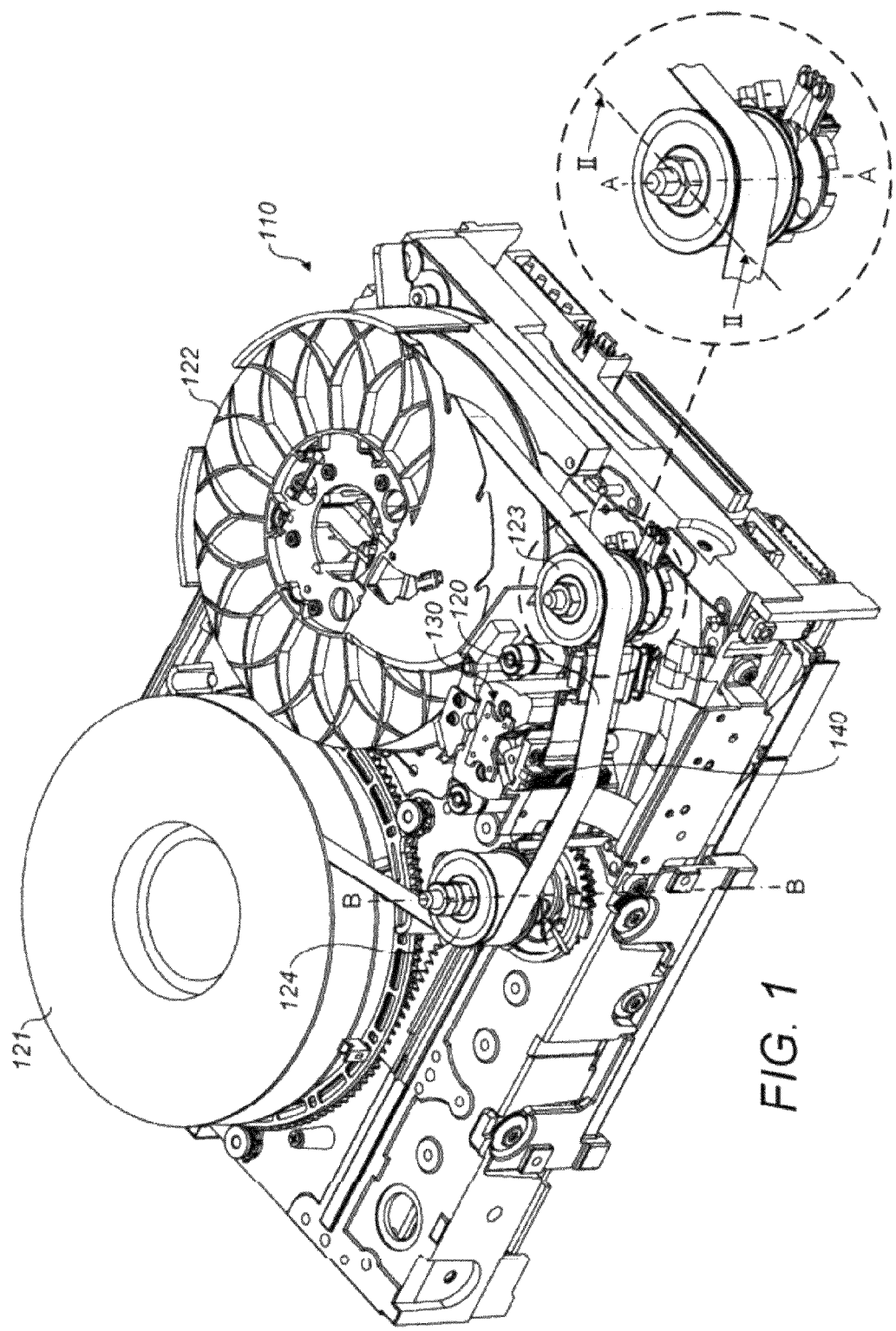
FIG. 1 is a perspective a few from the top, rear and one side of selected portions of a magnetic tape drive in use, with a received tape guided using two tape guides.

Referring to FIG. 1, there is shown a perspective view from the top, rear and one side of selected portions of a magnetic tape drive 110, shown in use with a magnetic data storage tape 120 guided along a path using guides 123, 124. The tape path passes between a tape reel 121 of a tape cartridge (not shown) removably received within the drive 110 and a tape reel 122 of the drive 110. The tape is guided by the tape guides 123, 124 across transducer head apparatus 140 disposed along the path between the tape guides 123, 124. FIG. 1 relates to a single reel tape drive 110 according to linear tape open (LTO) technology, although alternative embodiments are applicable to guides for use in other types of tape drive, including two reel tape cartridge technologies. The guides 123, 124 shown in FIG. 1 take the form of rollers mounted by spindles for rotation about respective axes A-A and B-B extending in a direction generally laterally of the tape path, although alternative embodiments include non-rotatable guides.

Figure 2:
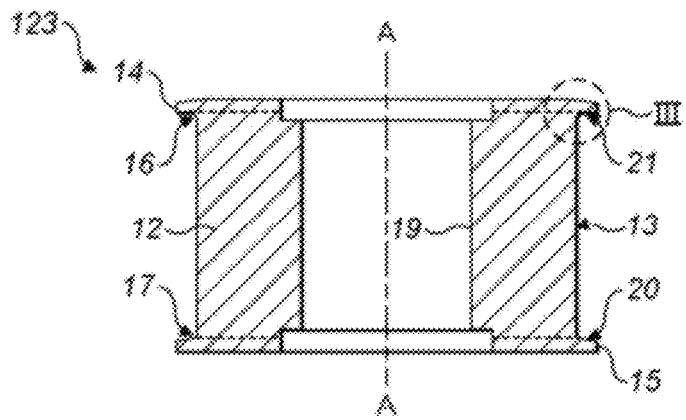
FIG. 2 is a sectional view of one of the guides taken on the line II-II in FIG. 1.

FIG. 2 is a sectional view of the guide 123 along a vertical plane, indicated by II-II in FIG. 1, passing through the axis A-A. The guide 123 comprises a generally tubular body having a curved support portion in the form of a generally cylindrical main body portion 12 providing a radially outer curved surface 13 for supporting a major tape surface, for example the data bearing tape surface. At opposite axial and portions thereof, the guide 123 also comprises lateral guide portions in the form of flanges 14, 15 for guiding the tape in a lateral direction, that is, lateral to the direction of movement of the tape along the tape path. The flanges 14, 15 adjoin the main body portion 12 and extend radially outwardly of the main body's outer surface 13, providing respective axially inwardly directed circumferentially extending surfaces 20, 21. The axial separation of the inwardly facing flange surfaces 20, 21 is selected according to the lateral dimensions of the tape to be guided. An axially extending bore provides a radially inwardly facing surface 19 for mounting the guide 123 to a spindle.

Figure 3:
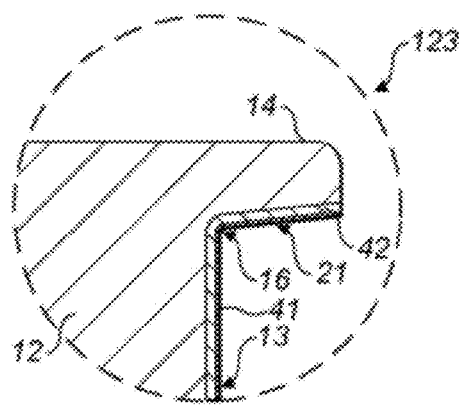
FIG. 3 shows further detail of a region of the tape guide indicated by broken lines in FIG. 2.
Figure 4:
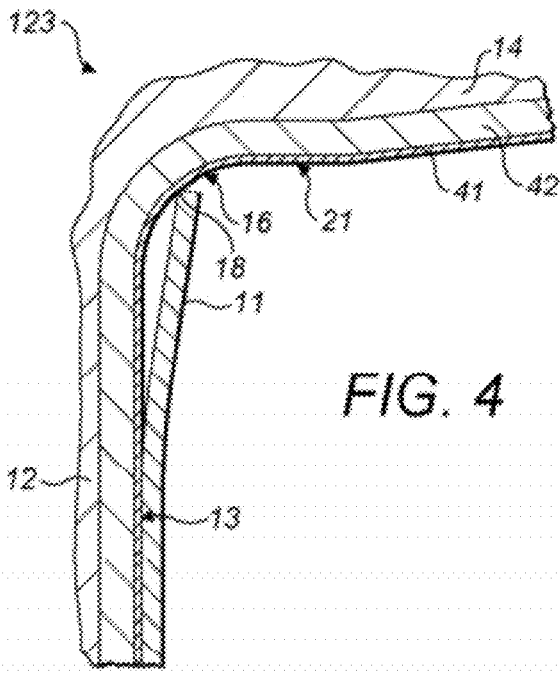
FIG. 4 shows part of the detail of FIG. 3, with the guide in use in contact with a tape.
Figure 5:
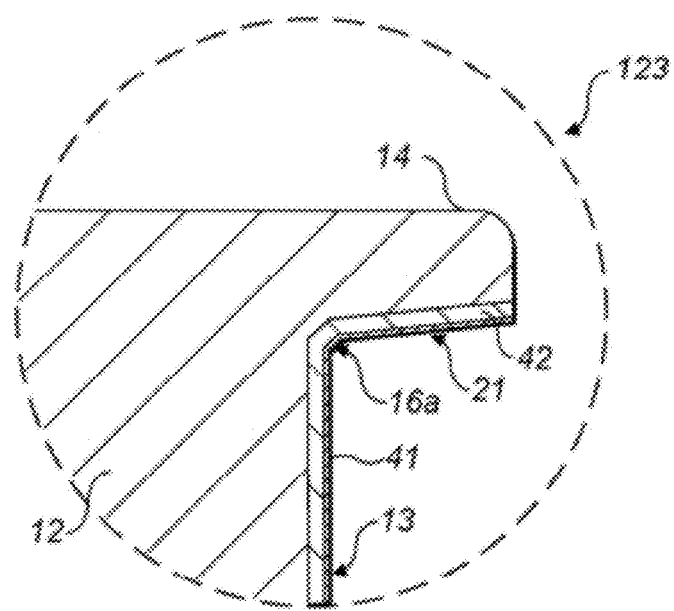
FIGS. 5 and 6 show further details of the region for alternative embodiments.
Figure 6:
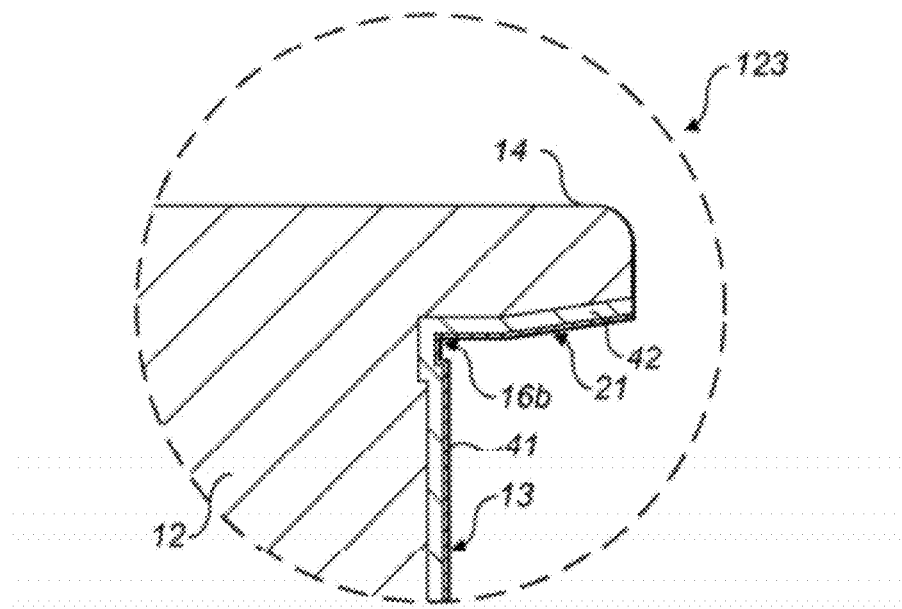

FIG. 3 shows further detail of a portion of the guide 123 indicated by in FIG. 2, and FIG. 4 shows part of FIG. 3 enlarged, with the guide 123 in contact with a tape 11. In the present embodiment, the structure of the corresponding opposite axial end portion (not shown in detail) of the guide 123 corresponds to the structure described herein with reference to FIGS. 3 and 4. In a region 16 of transition from the main body portion 12 to the flange 14, 15, the radially outer surface of the guide 123 has a curved or arcuate cross-section having, for example a radius of curvature of approximately 0.1 mm, or any other convenient curvature. If the tape experiences excessive lateral displacement, that is, axially of the guide 123, the curved transition region provides a force to an edge 18 of the tape 120 to counteract the undesired displacement, which counteractive force increases with increasing amounts of tape displacement. In alternative embodiments, the transition region 16 can have other profiles. For example, FIG. 5 shows an alternative embodiment in which guide 123 has a transition region 16a providing a bevel having a flat profile in cross-section, and FIG. 6 shows a further alternative embodiment in which guide 123 has a transition region 16b having a generally rectangular transition profile in cross-section, the main body portion 12 having a radially inwardly extending recess adjacent to the transition. In still further alternative embodiments, any other convenient transition region profile may be employed.

As best seen in FIG. 4, the guide 123 comprises coatings 41, 42, at least in the transition region 16, 16a, 16b. Coating 42 comprises a material that is highly resistant to wear caused by moving contact with the tape 120. In the present embodiment the coating 42 has a surface hardness of at least 20 GPa. The coating 41 may be, for example, a diamond like carbon (DLC) material, tungsten carbide (WC), or similarly wear resistant material. In one embodiment, a DLC coating 42 has a surface hardness of about 20 GPa and suitable amorphousness to provide in combination higher wear resistance than is generally available from lower surface tension materials such as zirconium nitride, titanium nitride, chromium nitride, titanium aluminium nitride, silicon nitride. Further coating 41 has a lower surface tension than the coating 42. The coating 41 in the present embodiment is a surface coating having a surface tension of not more than 40 mN/m. For example, the surface coating may be a nitride coating such as zirconium nitride, titanium nitride, chromium nitride, titanium aluminium nitride or silicon nitride, or any other suitable coating exhibiting sufficiently low surface tension. Conveniently, the coating 41 has a hardness of at least 10 GPa. The surface coating 41 can have a lower wear resistance than is required for the coating 42. The coatings 41, 42 can extend merely over the transition region 16, 16a, 16b where the highest guide to tape contact forces are likely to occur, or can also extend over other guide surfaces for example the axially inwardly facing surfaces 20, 21 and/or the radially outwardly facing surface 13.

Conveniently, the further coating 41 is very thin, for example having an average thickness of 0.1 μm or less, at least in the transition region 16, 16a, 16b. The coating 42 of the present embodiment is thicker than the further coating 41, for example having an average thickness in the range 0.5 μm to 3 μm or greater, at least in the transition region 16, 16a, 16b. The exemplary surface coating 41 can be much thinner than the coating 42, for example having an average thickness of 20% or less of the average thickness of the under coating 42, at least in the transition region 16, 16a, 16b.

One convenient combination of coatings is provided using an intermediate core structure in the form of a body comprising, for example, aluminium, having applied thereto an under coating 42 of DLC, and a surface coating 41 of zirconium nitride having a surface tension of less than 30 mN/m, for example 26 mN/m. An advantageous alternative combination is a DLC under coating 42 with a CrN surface coating 41 having a surface tension of about 31 mN/m or less. The CrN combination can facilitate better adhesion of the surface coating 41 to the under coating 42. The zirconium nitride combination can facilitate presentation of a lower surface tension to the tape. In both cases, no nickel coating is necessary between the aluminium and the DLC coating 42. Alternative materials for manufacturing the intermediate guide structure include, but are not limited to, brass, steel and magnesium.

Figure 7:
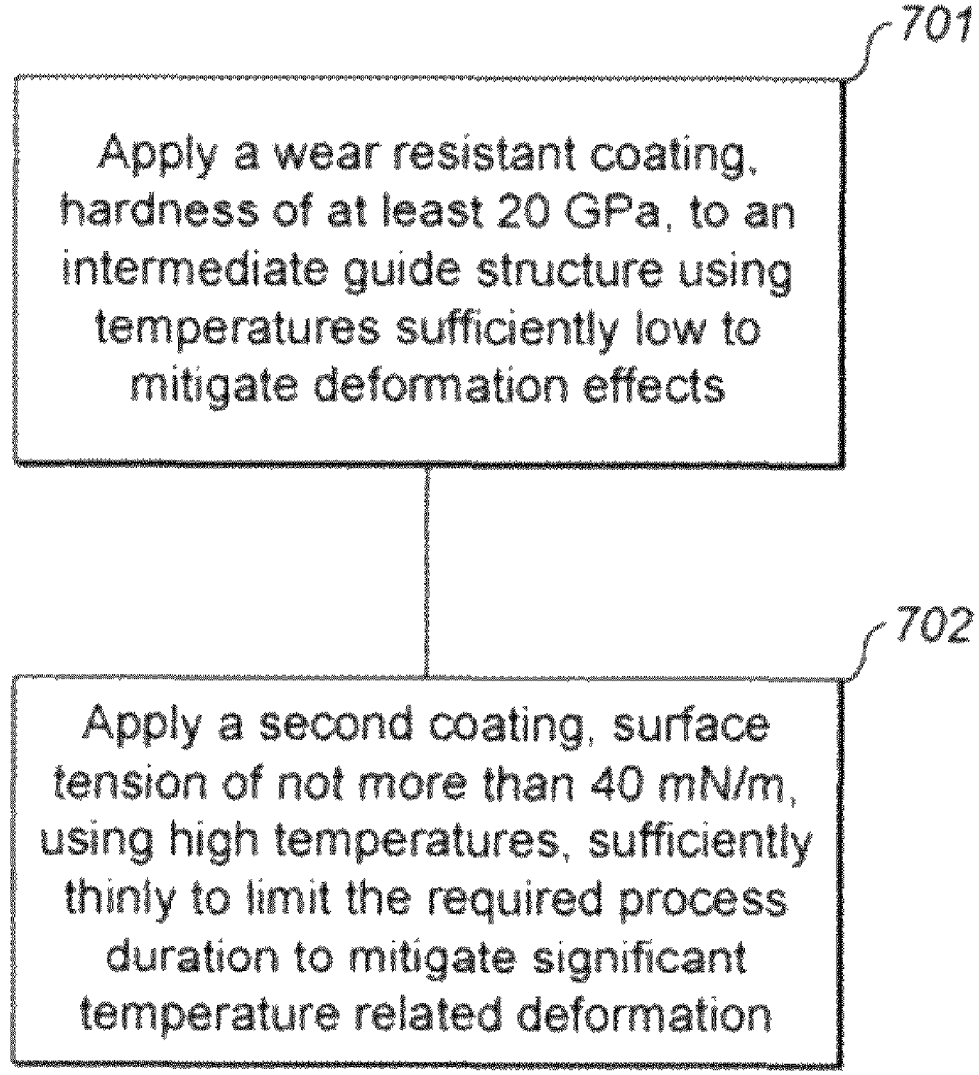
FIG. 7 is a flow diagram illustrating a method of making a tape guide.

The first coating 42 is applied to the intermediate guide structure using process temperatures sufficiently low to mitigate significant undesirable temperature related deformation and/or hardening effects on the intermediate structure (step 701, FIG. 7). For example, in one exemplary method a coating 42 of DLC is applied directly to an intermediate core structure comprising aluminium using a physical vapour deposition (PVD) process, at least in the transition region 16, 16a, 16b. Advantageously, pre-treatment, such as nickel coating, of the core structure is not required. Also advantageously, the process temperature required for such a DLC coating can be maintained below the threshold of about 160° C., above which threshold permanent temperature related deformation and/or hardening effects can occur to the core structure. This facilitates the application of a relatively thick DLC coating, for example having an average thickness in the range 0.5 µm to 3.0 µm or greater, without adversely affecting the tolerances of the guide 123. DLC has a high hardness, for example of about 20 GPa, and a suitably amorphous structure, which characteristics contribute to high wear resistance.

The further coating 41 is applied over at least a portion of the first coating 42 using process temperatures sufficiently high to cause, over some process durations, significant temperature related deformation effects on the intermediate structure, the further coating 41 when applied having a surface tension of not more than 40 mN/m (step 702, FIG. 7). For example, in one exemplary method, a coating 41 of zirconium nitride is applied over at least a portion of the DLC coating 42 using a PVD process such as, for example, magnetron sputtering or any other convenient coating process. Generally, PVD processes for zirconium nitride coatings require process temperatures well in excess of 160° C., for example in the region of 200° C., which is sufficiently high, if applied for a sufficiently long process duration, to cause permanent temperature related deformation and/or hardening of the core structure. The zirconium nitride coating 41 is applied sufficiently thinly, for example to an average thickness of 0.1 µm or less, at least in the transition region 16, 16a, 16b, to limit the required process duration, thereby mitigating significant temperature related deformation and/or hardening effects at the higher process temperatures. The zirconium nitride coating 41, when applied, has a surface tension of not more than 40 mN/m. Using zirconium nitride PVD processes, suitable coatings 41 having surface tensions of below 30 mN/m, for example 26 mN/m, should be achievable. In alternative embodiments, tungsten carbide (WC) or another suitable highly wear resistant material can be used instead of DLC to provide a relatively thick under coating 42 using a relatively low temperature coating process, and/or the zirconium nitride coating process can be replaced by a titanium nitride, chromium nitride, titanium aluminium nitride, silicon nitride or other suitable coating process to provide a suitably thin alternative surface coating 41 having a surface tension of not more than 40 mN/m.

While not being bound by any particular theory, it is thought that, at least in some embodiments, due to provision of a suitably highly wear resistant under coating 42, the guide 123 can accommodate limited excessive wear in the somewhat less wear resistant low adhesion outer coating 41, for example in a relatively small area of the transition region where the edge 18 of the tape can contact the guide with a high contact force. The highly wear resistant under coating 42 will prevent further wear of the guide 123 in the affected area. Although the under coating 42 does not exhibit low tape adhesion properties, because extreme wear of the surface coating 41 is restricted to a localised area, the overall low adhesion performance provided by the surface coating 41 is maintained. Further coatings having surface tensions of about 31 mN/m or less have been found to be particularly effective in mitigating tape debris adhesion in the transition region 16, 16a, 16b, although further coating surface tensions up to about 40 mN/m can provide acceptable performance in some circumstances.

At least some embodiments according to the above description facilitate provision of a guide 123 that provides sufficiently low tape adhesion while also exhibiting wear resistance sufficient to withstand high guiding forces experienced at increasingly higher tape speeds. Low tape adhesion facilitates mitigation of tape debris accumulation in the transition region 16, 16a, 16b and consequent adverse effects on guiding performance. At least some embodiments further facilitate provision of a convenient method of manufacturing a wear resistant low adhesion guide 123 while maintaining high dimensional tolerances, required for example by some next-generation tape drives. At least some embodiments also facilitate improved wear resistance even in guides 123 having transition regions 16, for example having an arcuate profile, that provide proportionally increasing counteractive forces which can cause particularly high localised stress and wear.

The invention claimed is:

1. A guide for guiding a magnetic data storage tape, the guide comprising:
    a curved support portion for supporting a major tape surface;
    at least one flange adjoining the support portion; and, at least in a region of transition between the support portion and the at least one flange:
        an under coating of a tungsten carbide (WC); and
        a surface coating having lower surface tension than the under coating.

2. The guide of claim 1, wh&ein the surface coating has a surface tension of not more than 40 mN/m, and the under coating has a surface hardness of at least 20 GPa.

3. The guide of claim 1, wherein the surface coating has a surface tension of not more than 31 mN/m, and the under coating has a surface hardness of at least 20 GPa.

4. The guide of claim 1, wherein the surface coating comprises a nitride.

5. The guide of claim 1, wherein the surface coating comprises at least one material selected from the group comprising: zirconium nitride, titanium nitride, chromium nitride, titanium aluminium nitride, silicon nitride.

6. The guide of claim 1, wherein the surface coating has lower wear resistance than the under coating.

7. The guide of claim 1, wherein, at least in the transition region, the surface coating has an average thickness of 20% or less of the average thickness of the under coating.

8. The guide of claim 1, wherein, at least in the transition region, the surface coating has an average thickness of 0.1 μm or less.

9. The guide of claim 1, wherein, at least in the transition region, the under coating has an average thickness in the range 0.5 μm to 3.0 μm.

10. The guide of claim 1, wherein the surface coating comprises magnetron sputtered zirconium nitride.

11. The guide of claim 1, wherein the guide comprises an aluminium core structure, the under coating being applied to the core structure without an intervening nickel coating.

12. The guide of claim 1, wherein the guide comprises a roller.

13. The guide of claim 1, wherein the transition region is configured to provide a force to counteract excessive lateral tape displacement, which counteractive force increases with increasingly excessive lateral tape displacement.

14. Tape drive apparatus comprising at least one tape guide, the or each tape guide comprising:
   a body;
   a diamond like carbon (DLC) coating applied over at least a portion of the body; and
   applied over at least a portion of the DLC coating, a very thin further coating having a lower surface tension than the DLC.

15. The tape drive apparatus of claim 14, wherein the further coating has an average thickness of 0.1 μm or less.

16. The tape drive apparatus of claim 14, wherein the further coating comprises at least one material selected from the group comprising: zirconium nitride, titanium nitride, chromium nitride, titanium aluminium nitride, silicon nitride, and has an average thickness of 20% or less of the average thickness of the DLC coating.

* * * * *

UNITED STATES PATENT AND TRADEMARK OFFICE
CERTIFICATE OF CORRECTION

| | |
|---|---|
| PATENT NO. | : 8,210,463 B2 |
| APPLICATION NO. | : 12/571331 |
| DATED | : July 3, 2012 |
| INVENTOR(S) | : Henricus Ruyten et al. |

It is certified that error appears in the above-identified patent and that said Letters Patent is hereby corrected as shown below:

In column 1, line 26, delete "region" and insert -- region III-III --, therefor.

In column 2, line 7, delete "by" and insert -- by III-III --, therefor.

In column 4, line 51, in Claim 2, delete "wh&ein" and insert -- wherein --, therefor.

Signed and Sealed this
Nineteenth Day of March, 2013

Teresa Stanek Rea
*Acting Director of the United States Patent and Trademark Office*